(12) United States Patent
Clark

(10) Patent No.: US 7,614,852 B2
(45) Date of Patent: Nov. 10, 2009

(54) WIND TURBINE BLADE AND ASSEMBLY

(76) Inventor: Philip G. Clark, 7517 W. 15th St., Sioux Falls, SD (US) 57106

( * ) Notice: Subject to any disclaimer, the term of this patent is extended or adjusted under 35 U.S.C. 154(b) by 0 days.

(21) Appl. No.: 12/004,632

(22) Filed: Dec. 24, 2007

(65) Prior Publication Data
US 2009/0160194 A1    Jun. 25, 2009

(51) Int. Cl.
*F03D 1/06* (2006.01)
(52) U.S. Cl. ............... 416/243; 416/196 A; 416/197 A
(58) Field of Classification Search ............... 415/123, 415/124.1; 416/132 A, 132 B, 170 R, 196 A, 416/228, 238, 243, DIG. 2, DIG. 5
See application file for complete search history.

(56) References Cited
U.S. PATENT DOCUMENTS

| 489,885 | A | * | 1/1893 | Williams ............... 416/196 R |
| 519,362 | A | * | 5/1894 | Wallace ............... 416/196 R |
| 527,157 | A | * | 10/1894 | Rigby et al. ............... 416/14 |
| 538,594 | A | * | 4/1895 | O'Bryant ............... 416/15 |
| 1,654,436 | A | * | 12/1927 | Snook ............... 416/196 R |
| 2,008,234 | A | * | 7/1935 | Weeks ............... 416/233 |
| 2,137,559 | A | * | 11/1938 | Algee ............... 416/189 |
| RE21,382 | E | * | 3/1940 | Stuart ............... 290/55 |
| 2,360,792 | A | * | 10/1944 | Putnam ............... 290/4 R |
| 4,150,301 | A | * | 4/1979 | Bergey, Jr. ............... 290/44 |
| 4,324,528 | A | * | 4/1982 | Svenning ............... 416/132 B |
| 4,330,714 | A | * | 5/1982 | Smith ............... 290/55 |
| 4,359,311 | A |   | 11/1982 | Benesh |
| 5,151,014 | A |   | 9/1992 | Greenwald et al. |
| 5,562,420 | A |   | 10/1996 | Tangler et al. |
| 5,711,653 | A | * | 1/1998 | McCabe ............... 416/237 |
| 6,039,533 | A |   | 3/2000 | McCabe |
| 6,201,315 | B1 | * | 3/2001 | Larsson ............... 290/55 |
| 6,554,573 | B1 | * | 4/2003 | Pedersen ............... 416/117 |
| 6,705,838 | B1 |   | 3/2004 | Bak et al. |
| 6,739,835 | B2 |   | 5/2004 | Kim |
| 6,752,595 | B2 | * | 6/2004 | Murakami ............... 416/87 |
| 7,056,089 | B2 |   | 6/2006 | Sonoda et al. |
| 2002/0047806 | A1 |   | 4/2002 | Ishikawa |
| 2003/0077178 | A1 |   | 4/2003 | Stearns |
| 2003/0143079 | A1 |   | 7/2003 | Kawarada et al. |
| 2006/0239821 | A1 | * | 10/2006 | McCabe ............... 416/197 A |

OTHER PUBLICATIONS

D.M. Somers, The S825 and S826 Airfoils, Period of Performance: 1994-1995, NREL/SR-500-36344, Jan. 2005.

* cited by examiner

*Primary Examiner*—Edward Look
*Assistant Examiner*—Nathaniel Wiehe
(74) *Attorney, Agent, or Firm*—Jeffrey A. Proehl; Woods, Fuller, Shultz & Smith PC

(57) ABSTRACT

A blade is disclosed for use in a wind turbine, with the blade having a longitudinal axis for extending radially outwardly from a center of rotation of the blade on the wind turbine. The blade has a front side with a front surface for orienting in a windward direction and a rear side with a rear surface for orienting in a leeward direction. The blade has a profile taken in a plane oriented substantially perpendicular to the longitudinal axis of the blade. The profile of the blade has a leading edge and a trailing edge. The profile is characterized by a camber ratio, and the camber ratio of the profile is greater than or equal to approximately 4%.

83 Claims, 9 Drawing Sheets

Fig. 4 - Dynamic Wind Tunnel Tests with a Rotating Turbine

WIND TURBINE BLADE AND ASSEMBLY

BACKGROUND

1. Field

The present disclosure relates to power generating wind turbines and more particularly pertains to a wind turbine blade and assembly having a greater ability to capture energy from wind than known designs.

2. Description of the Prior Art

Windmills have long been used to extract kinetic energy from the wind. More recently wind turbines have been designed to harvest the kinetic energy from the wind and convert this kinetic energy into electrical energy. The preferred type of wind turbine for electricity generation applications is a horizontal axis wind turbine (HAWT). A horizontal axis wind turbine is a wind turbine whose rotor hub axis is mounted substantially horizontally with respect to the ground.

Over the years improvements have been made to earlier wind turbine blades. The focus of these improvements has been primarily directed toward airfoil designs. In using airfoil technology, improvements have focused on a number of areas of airfoil design—the shape of the airfoil and the pitch angle $\theta$ of the airfoil are two important factors. The shape of these foils has always required a high Reynolds number.

In the efforts to discover a better shape to achieve greater lift, and thus increased efficiency, the improvements have primarily focused on the Bernoulli principal of aircraft wing design that holds that the major lift on an aircraft wing is caused by the presence of a relatively reduced naturally existing ambient air pressure on the upper surface of the wing as it travels through the moving wind. A review of current literature indicates that scant attention has been paid to the increased air (lift) forces on the lower surface of the airfoil. The lift generated by the airfoils of conventional wind turbines is translated into rotational torque. The developments in wind turbines have included the use of very long, streamlined airfoils for the blades. However, blades with a long length have tip speeds that are extremely high (above 170 mph), and thus the leading edge speed of the airfoil moving through the air varies significantly along the length of the blade. This factor has lead to the pursuit of a better twist characteristic for the airfoil design to match the different speeds of the airfoil at different distances from the root of the blade.

Other improvements include systems to rotate the blade about the longitudinal axis of the blade to dynamically vary the pitch angles of the airfoil in an attempt to avoid stall conditions for the airfoil. Continuous monitoring of the wind speed and the pitch angle $\theta$ of the airfoils permits the pitch angle $\theta$ to be continuously varied in an attempt to match the pitch angle $\theta$ to the wind speed and thereby avoid stalling as well as increasing the lift of the airfoil and thus maximize the kinetic energy extracted from the wind. Stalling is a condition where the airfoil loses lift due to excessive pitch relative to the wind speed, and as a consequence the airfoil is unable to exert torque. The range of effective pitch angles for the airfoil designs that are commonly employed is approximately 10 degrees to approximately 17 degrees. Pitch angles greater than this range typically result in stalling of the conventional airfoil designs. This limited range of effective pitch angles limits power output.

The first purpose of variable pitch systems is to control the revolutions per minute (RPMs) of the electrical generator. An alternating current generator must turn at the exact revolutions of the cycles of the alternating current in the electrical grid into which the electricity is being utilized. Off cycle electricity is useless and harmful to the system. Further, variable pitch systems are complicated, expensive, high maintenance and there failure is very costly.

Typically, the blades of the wind turbines employ airfoils designed to have high Reynolds numbers. Airfoils with high Reynolds numbers typically have a sleek shape that moves through the air at a high rate of speed while offering a minimum amount of drag or resistance to the rotation of the blade about the substantially horizontal axis of the wind turbine. Common airfoil designs employ only a small degree of camber, which is the ratio of the difference of the distance between the chord line and the mean camber line (at any point along the chord line) divided by the length of the chord line. Some have a camber value of less than 4% camber, but camber values above approximately less than about 4% are considered unsuitable for use with wind turbines as airfoil designs with such camber values have unacceptably low Reynolds numbers for current designs, which experience blade tip speeds of high velocity.

The design of airfoils is and has been based on airfoils in flight such as airplane wings. Because the application of Bernoulli's principals dominates the design of this technology, the shape of the lower surface of the airfoil has received scant attention in airfoils designed for wind turbines. The lower surface of many airfoils used on wind turbines today are influenced by the desire to strengthen the support structure for the blade by creating a deeper cross section to resist bending or breaking of the blade. The desire to have a deeper cross sectional area thus frequently influences the shape of the lower surface of these airfoils. The great lengths of the blades typically utilized on current wind turbines thus requires a strengthened structure which in turn affects the shape of the lower surface of the airfoil. Because of the focus on the Bernoulli principal and the structural design constraints, the lower surface of wind turbine airfoils is greatly underutilized as a harvester of kinetic energy.

Yet Newton's Laws teach that there is a great potential for harvesting energy with the lower surface of an airfoil. However, the lower surfaces of current wind turbine airfoils are not designed to maximize the harvesting of the winds kinetic energy efficiently.

Furthermore, it has been found that the airfoil designs of most existing wind turbines have a relatively high cut in wind speed, which is the lowest speed at which the force of the wind acting on the airfoil overcomes factors such as starting friction or inertia and begins producing usable power. Typically, the cut-in wind speed is about 8 miles per hour or higher, which means that wind speeds lower than about 8 miles per hour do not result in power generation.

In these respects, the wind turbine blade design according to the present disclosure substantially departs from the conventional concepts and designs, and in so doing provides a wind turbine blade and assembly believed to be more effective at capturing energy from the wind than the conventional concepts and designs.

SUMMARY

In view of the foregoing disadvantages inherent in the known shape characteristics of blades in power generating wind turbines now present in the prior art, the present patent application discloses a new wind turbine blade and assembly wherein the same can be utilized for extracting a greater degree of the available energy from wind than is believed possible using existing blade designs. This belief is based on the application of Newton's laws of motion. Newton's laws are central in the design of the lower surface of the new wind turbine blade. Empirical testing has shown that much greater kinetic energy from the wind can be harvested from a highly cambered wind turbine blade.

To attain this, the present invention generally comprises a blade for use in a wind turbine. The blade has a longitudinal axis for extending radially outwardly from a center of rotation of the blade on the wind turbine. The blade has a front side with a front surface for orienting in a windward direction and a rear side with a rear surface for orienting in a leeward direction. The blade has a profile taken in a plane oriented substantially perpendicular to the longitudinal axis of the blade, and the profile has a leading edge and a trailing edge. The profile is characterized by a camber ratio, and the camber ratio of the profile may be approximately 4% or greater.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Advantages of the disclosed invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
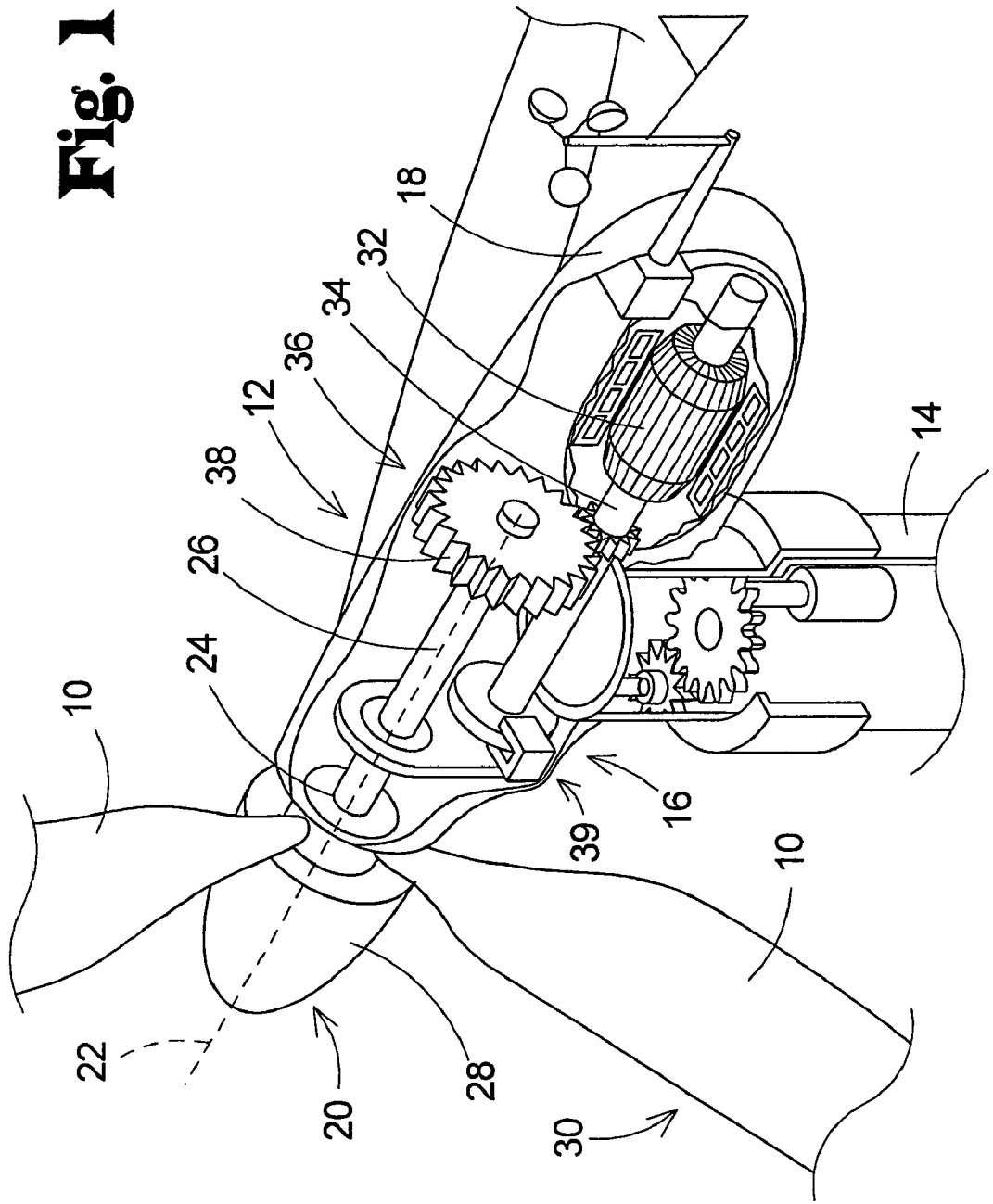
FIG. 1 is a highly schematic perspective view of a wind turbine suitable for the new wind turbine blade and assembly of the present disclosure.

With reference now to the drawings, and in particular to FIGS. 1 through 11 thereof, a new wind turbine blade and assembly design embodying the principles and concepts of the present invention and generally designated by the reference numeral 10 will be described.

In general, the blade 10 of this disclosure is highly suitable for employment on a wind turbine 12, such as a wind turbine that is employed to generate electricity using the naturally occurring flow of air in the environment that is typically referred to as wind. It will be appreciated that while this use of the blade 10 is the focus of this disclosure, other uses of the blade may be envisioned. In FIG. 1, an illustrative wind turbine 12 includes an upright tower 14 and a power generation apparatus 16 mounted on the upright tower 14. Typically, the power generation apparatus 16 is rotatable about a substantially vertical axis to orient the power generation apparatus 16 with respect to the upright tower 14, and more importantly the direction of the wind, as the direction of the wind will vary and the orientation of the power generation apparatus 16 will also need to be varied to address the change in the wind direction. The various components of the power generation apparatus 16, with at least one significant exception, may be positioned in a housing or nacelle 18 that encloses the apparatus.

The power generation apparatus 16 may include a rotor assembly 20 that is rotatable about a primary axis 22, and the primary axis 22 may be substantially horizontally oriented, although this is not critical to the operation of the invention. The rotor assembly 20 has a center of rotation 24 about which the components of the assembly 20 rotate, and will generally be positioned on the primary axis 22. The rotor assembly 20 may generally comprise a primary shaft 26 that is rotatable about the primary axis 22, a hub 28 that is rotatable with the primary shaft 24, and a plurality of blades 30 mounted on and radiating outwardly from the hub 28. The blade 10 may comprise one or all of the blades of the plurality of blades 30 of the rotor assembly 20. The hub 28 and plurality of blades 30 may be positioned outside of the nacelle 18. The wind turbine 12 may further include a generator 32 mounted on the upright tower 14, and the generator may be configured to be rotated by the primary shaft 26. The generator 32 may be rotatable about a secondary shaft 34. The secondary shaft 34 may be substantially horizontally oriented. The generator 32 may include an armature rotating with the secondary shaft 34.

A power transmission assembly 36 may be employed for transmitting rotation of the rotor assembly 20 to the generator 32. The power transmission assembly 36 transfers rotation from the primary shaft 26 of the rotor assembly 20 to the secondary shaft 34 of the generator 32. The power transmission assembly 36 may include a gearbox 38 for increasing the speed of rotation as the rotation is transferred from the primary shaft 26 to the secondary shaft 34, although this function is not necessary. The power transmission assembly 36 may also include a brake apparatus 39 that is configured to selectively slow or even stop rotation of the shafts.

The wind turbine 12 may also include other components such as an orientation apparatus that is configured to orient the power generation apparatus 16 with respect to the upright tower responsive to a direction of wind movement. The orientation apparatus may include a yaw motor and a yaw drive to produce relative rotation between the power generation apparatus 16 and the tower 14. The wind turbine 12 may also include various controllers for controlling operation of the various systems of the wind turbine such as the orientation apparatus and apparatus for adjusting the pitch of the blades.

Turning now to the design of the blade 10, the present disclosure is generally directed to a blade having a camber characteristic that takes advantage of Newton's first law that a moving object tends to move in a straight line. The wind encountering the blade 10 is initially moving in a substantially straight line. Upon the wind contacting the blade 10, the blade turns the direction of movement of the wind and thus imparts lateral acceleration to the air mass, which requires force as defined in Newton's first law. The force of the contact of the wind with the blade transfers torque to the primary shaft 26 of the wind turbine 12. The blade 10 thereby not only harvests kinetic energy on the top (convex) side of the blade from the wind via the Bernoulli principal but also by the force created on the underside (concave) side of the blade by Newton's first law of motion when the air mass of the wind is turned. This is further confirmed by Newton's third law that for every action there is an equal and opposite action. The action (force) that turns the air mass of the wind imparts an opposite action (force) to the blade 10 thus creating rotation and torque that is generated on the under (concave) side of the blade.

Table 1 contains exemplary data from dynamic wind tunnel tests conducted at a wind speed of approximately 21 miles per hour (mph). Two blade shapes were each tested in a three blade configuration. One airfoil shape tested was S826 Blade. The S826 blade was developed by the US Government's National Renewable Energy Laboratory in Boulder, Colo. It is considered to be a standard airfoil for wind turbine airfoils. The S826 airfoil has a less than 4% camber ratio.

Another blade shape tested utilized a concave underside according to the current invention with a 14.8% camber ratio. The tests were conducted at pitch angles θ varying by 5 degree increments ranging from approximately 10 degrees to approximately 45 degrees. The data entries in the table below each blade shape are the reading of the horsepower generated at the stated pitch angle θ and at an approximately 24.3 mph wind speed. These dynamic wind tunnel tests are presented graphically in FIG. 4, which shows the results of dynamic wind tunnel testing with a rotating turbine at a wind speed of approximately 24.3 mph, showing a performance comparison between a blade of the present invention having an approximately 14.8% camber ratio and a blade having an S826 airfoil configuration with a camber ratio of less than 4%, in a three blade configuration, an approximately 36" chord length, and an approximately 48" blade length.

TABLE 1

| Pitch Angle θ Degrees | S826 with Less Than 4% Camber Ratio Hp (36" Chord) Horsepower | Present Invention with 14.8% Camber Ratio Hp (36" Chord) Horsepower | Percent Increase |
|---|---|---|---|
| 10° | 0.40 | 7.85 | 1962% |
| 15° | 0.74 | 7.51 | 1020% |
| 20° | 1.66 | 6.45 | 318% |
| 25° | 2.68 | 5.21 | 195% |
| 30° | 2.26 | 4.40 | 194% |
| 35° | 1.79 | 3.42 | 191% |
| 40° | 1.37 | 2.42 | 176% |
| 45° | 0.97 | 1.69 | 174% |
| Comparison of Best Performance of Each | 2.68 At a 25° Pitch Angle | 7.85 At a 10° Pitch Angle | 293% |

TABLE 2

36" Chord 48" Length

Pitch Angle of Blade Related to Plane of Rotation °

|  | 45 | 40 | 35 | 30 | 25 | 20 | 15 | 10 |
|---|---|---|---|---|---|---|---|---|
| 3 Blade - 14.8% Camber Ratio (Present Invention) | | | | | | | | |
| FT-LB | 20.55 | 26.02 | 32.78 | 38.85 | 42.86 | 49.89 | 54.98 | 56.59 |
| Rotor RPM | 28.79 | 32.51 | 36.48 | 39.62 | 42.54 | 45.26 | 47.86 | 48.55 |
| hp | 1.69 | 2.42 | 3.42 | 4.40 | 5.21 | 6.45 | 7.51 | 7.85 |
| kW | 1.27 | 1.81 | 2.56 | 3.29 | 3.90 | 4.83 | 5.63 | 5.88 |
| 3 Blade - Less Than 4% Camber Ratio (S826) | | | | | | | | |
| FT-LB | 13.90 | 17.50 | 20.84 | 24.43 | 27.44 | 19.89 | 11.50 | 7.79 |
| Rotor RPM | 24.46 | 27.41 | 30.02 | 32.37 | 34.19 | 29.24 | 22.43 | 17.77 |
| hp | 0.97 | 1.37 | 1.79 | 2.26 | 2.68 | 1.66 | 0.74 | 0.40 |
| kW | 0.73 | 1.03 | 1.34 | 1.69 | 2.01 | 1.24 | 0.55 | 0.30 |

Wind tunnel testing has demonstrated that the blade 10 may generate as much lift at wind speeds of approximately 4 miles per hour as more conventional wind turbine airfoil designs generate at wind speeds of approximately 8 miles per hour. Thus, higher lift at lower wind velocities is produced, and is believed to be an important advance in turbine efficiency and the availability of wind turbine energy. These factors allow for more kinetic energy to be harvested from the wind, creating greater torque at the hub shaft, thus generating greater amounts of electricity.

The camber characteristic of the blade 10 also provides a greater range of angles for the pitch angle θ 68 before stalling of the blade occurs. This greater range of angles for the pitch angle θ 68 gives wind turbines using the improved blade 10 a broader range of wind speeds in which to operate than the current airfoil designs. With the improved camber characteristic of the blade 10, the greater range of useful pitch angles provide higher torque levels to be achieved in a broader range of wind speeds, and the higher torque levels also persist over a greater range of wind speeds due to the camber characteristic of the blade 10.

Figure 2:
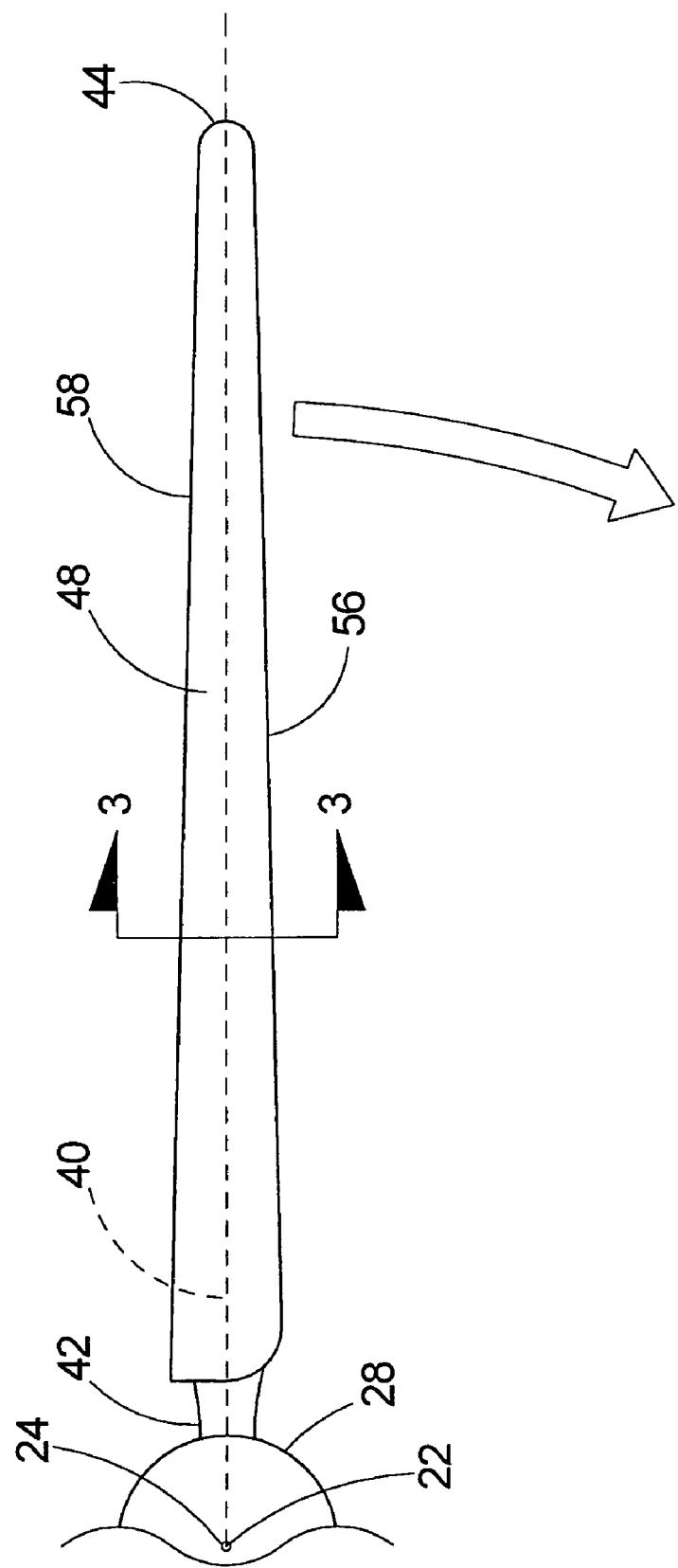
FIG. 2 is a schematic front view of the rotor assembly showing the rear side of a blade of the present disclosure.

In FIG. 2, in greater detail, the blade 10 of the plurality of blades 30 may be elongated with a longitudinal axis 40. The longitudinal axis 40 may extend radially outwardly from the center of rotation 24 of the rotor assembly 20. The blade 10 has a root end 42 connected to the hub 28 and a tip end 44 located opposite of the root end 42. The blade 10 has a front side 46 for orienting in a windward direction of the wind, with the front side having a front surface 48. The blade 10 has a rear side 50 for orienting in a leeward direction of the wind, with the rear side having a rear surface 52.

Figure 3:
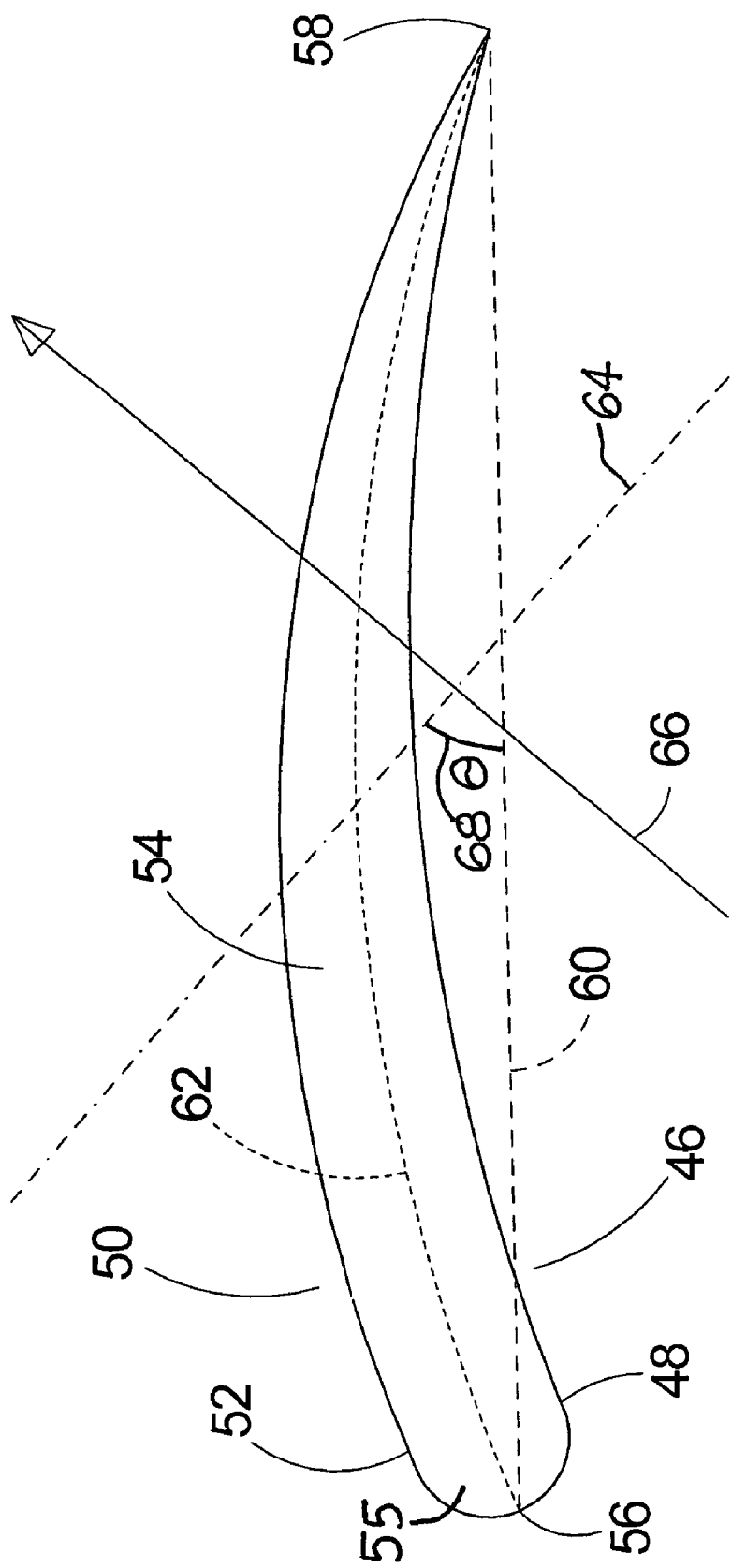
FIG. 3 is a schematic sectional view of the blade of the present disclosure taken along line 3-3 of FIG. 2.
Figure 4:
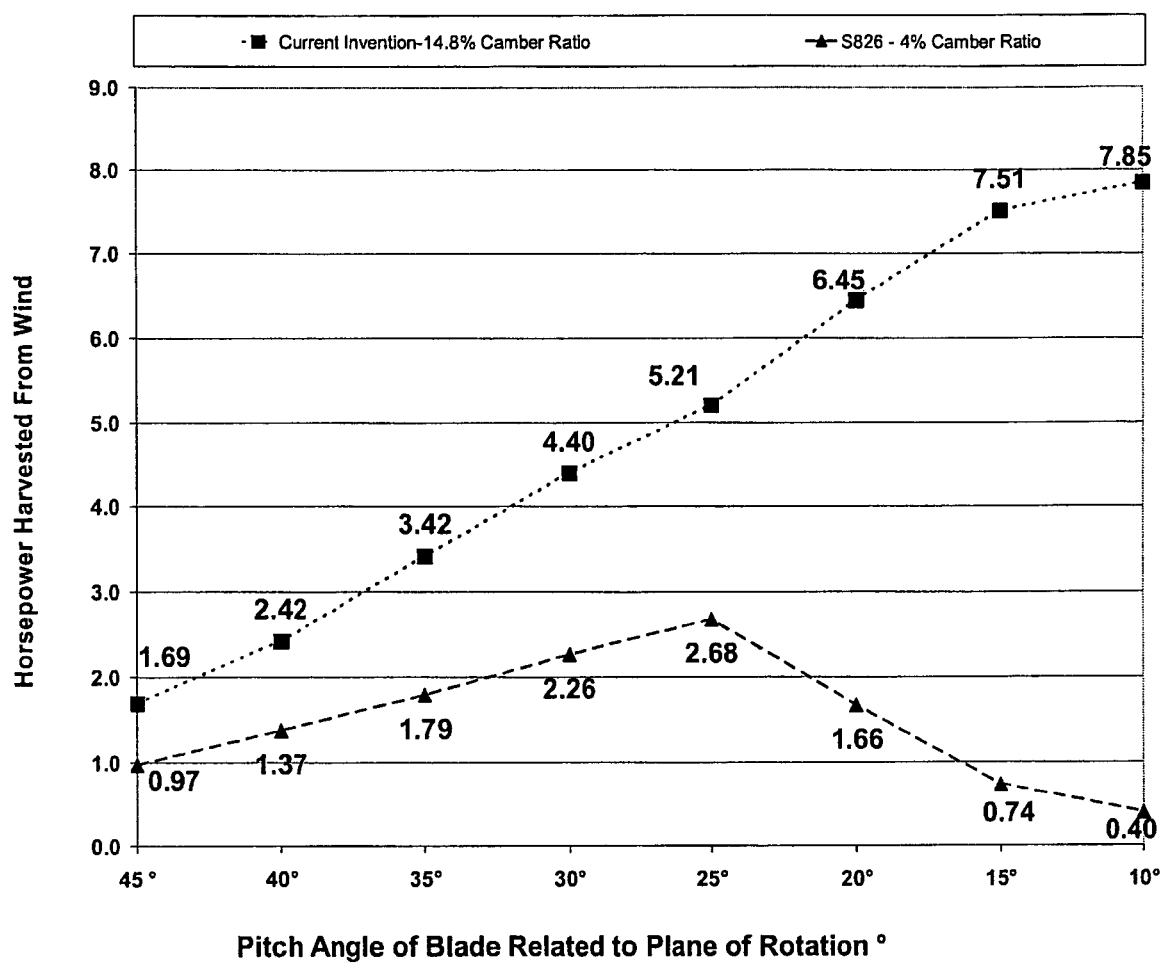
FIG. 4 is a schematic graph of the exemplary test results listed in Table 1.

In FIG. 3, the blade 10 has a profile 54 taken in a plane oriented substantially perpendicular to the longitudinal axis 40 of the blade, and thus may represent a section of the airfoil of the blade. In some embodiments, the blade 10 has a plurality of profiles 54 that are located at different discrete distances from the center of rotation 24 of the rotor assembly 20. The profiles 54 of the plurality of profiles may be different from each other, and may be designed for the different air speeds encountered by the different portions of the blade 10 when the blade is turning.

The profile 54 of the blade 10 has a nose 55, a leading edge 56, a trailing edge 58, a chord line 60, and a mean camber line 62. The distance between the leading edge 56 and the trailing edge 58 is the chord. The chord line 60 is a straight line connecting and extending between the point at the front of the leading edge 56 and a point at the tail or rear of the trailing edge 58. The leading edge 56 and trailing edge 58 of the profile 54 of the blade 10, and the locations of the ends of the chord line 60, correspond to the locations of the ends of the mean camber line 62. The mean camber line 62 is a line positioned half way between the front surface 48 and the rear surface 52 of the profile 54 of the blade 10. The mean camber line 62 originates at the leading edge 56 of the profile and terminates at the trailing edge 58 of the profile.

The nose 55 may have any shape. Illustratively, the shape of nose 55 may be thin, sharp, pointed, round, flat, triangular, or any other airfoil nose. The shape of the nose 55 may be aerodynamic or non-aerodynamic. For the purposes of this description of the blade 10 and the profile 54, the following terms have the following meanings. The mean camber line 62 is the locus of points halfway between the upper and lower surfaces of the airfoil. The leading edge 56 and trailing edge 58 are the most forward point and the most rearward point of the mean camber line, respectively. The chord line 60 is the straight line connecting the leading and trailing edge of the blade 10. The camber is the distance between the mean camber line and the chord line, measured perpendicular to the chord line. The camber ratio is the maximum camber divided by the chord. The thickness is the distance between the upper surface 52 and lower surface 48, also measured perpendicular to the chord line 60.

The chord is the length of the chord line 60 between the leading edge 56 and the trailing edge 58. The chord is a characteristic dimension of the profile. The maximum thickness of the profile 54 of the blade 10 between the front surface 48 and the rear surface 52 may be divided by the chord and expressed as a percentage. The location of the maximum thickness of the profile may be expressed as a percentage of the chord as measured from the leading edge 56 of the profile to the trailing edge 58.

The chord line 60 may be angled with respect to plane of rotation 64 in which the blades of the plurality 30 of blades turn. The plane of rotation 64 may be oriented substantially perpendicular to the primary axis 22, and when the rotor assembly 20 is suitably oriented, the plane of rotation 64 is also oriented substantially perpendicular to the direction of wind movement. The direction of wind movement may be substantially parallel to the primary axis 22, but this is not always the case. The chord line 60 may also be angled with respect to the primary axis 22. A pitch angle θ 68 is defined between the chord line 60 and the plane of rotation 64. In FIG. 3 of the drawings, reference line 66 is orientated substantially parallel to the primary axis 22. Reference line 66 may also represent the direction of wind movement across the blade 10 when the direction of wind movement is substantially parallel to the primary axis 22.

The camber characteristic of the blade 10 generally includes the front side 46 of the profile 54 of the blade being concave in shape, and in various embodiments may be concave over substantially the entire front surface 48. The camber characteristic may also include the rear side 50 of the profile 54 of the blade being convex in shape, and in various embodiments may be convex over substantially the entire rear surface 52. Thus, in some embodiments the profile 54 of the blade 10 is highly asymmetric with respect to the chord line 60.

The camber of the profile 54 of the blade 10 is the ratio of the difference of the distance between the chord line 60 and the mean camber line 62 (at any point along the chord line) divided by the length of the chord line 60 (the chord). In this description, the camber ratio is expressed as a percentage and is measured at the location of the greatest distance between the chord line 60 and the mean camber line 62, and thus represents the maximum camber of the profile 54 of the blade.

The camber characteristic of the blade 10 may also include a large degree of camber signifying a large divergence between the chord line 60 and the means camber line 62 with respect to the length of the chord line 60. In some embodiments, the camber ratio of the profile 54 of the blade falls in the range of approximately 4% camber to approximately 50% camber, although greater degrees of camber may be implemented with correspondingly higher camber ratios, and a camber of just slightly less than 4% camber might be employed. In various embodiments, the camber ratio may range from approximately 5% to approximately 45% camber. In still other embodiments, the camber may range from approximately 10% to approximately 40%.

With the blade 10 having the camber characteristics disclosed herein, the pitch angle θ 68 may lie in the range of approximately 5 degrees to approximately 85 degrees. In some more preferred embodiments, the pitch angle θ 68 is in the range of approximately 10 degrees to approximately 80 degrees. In some embodiments, the pitch angle θ 68 is approximately 60 degrees. In some embodiments of the invention, the pitch angle θ 68 is variable in response to the speed of the wind that is being encountered by the blade 10. This may be accomplished through the use of pitch adjustment means such as is known in the art.

In some embodiments of the present disclosure, the blade 10 will exhibit a degree of "twist" about the longitudinal axis 40 of the blade between the root end 42 and the tip end 44. As a result, the leading edge 56 and the trailing edge 58 of the blade 10 may tend to curve around or about the longitudinal axis 40 of the blade in a spiral or helical manner. The curvature of the leading edge 56 around the longitudinal axis of the blade 40 causes the pitch angle θ 68 to change along the length of the blade 10. The camber ratio of the profile 54 of the blade 10 may remain uniform as the leading edge 56 and the trailing edge 58 of the blade curve around the longitudinal axis between the root end 42 and the tip end 44. Optionally, the camber ratio of the profile 54 along the length of the blade 10 may vary one or more times along the length of the blade as the leading edge and the trailing edge of the blade curve around the longitudinal axis. Optionally, the twist characteristic may extend for substantially the entire length of the blade 10, or may be limited to a portion of the length.

A single blade 10 may have one or more sections with different chord lengths. The chords of the sections from the root end 42 to the tip end 44 of blade 10 may vary in length.

The variation in the blade 10 may include a tapering of the blade 10 from the root end 42 to the tip end 44 causing the chord of the tip end 44 to be shorter than the chord of the root end 42. The variation in the blade 10 may include a flaring of the blade 10 from the root end 42 to the tip end 44 causing the chord of the tip end 44 to be longer than the chord of the root end 42.

In some embodiments of the blade 10, the leading edge 56 of the profile of the blade is the thickness of the material being used to construct the blade. The blade 10 may comprise a curved plate. In other embodiments the leading edge of the profile is rounded or has a curvature.

The blade 10 may be formed of any suitable material, or combination of materials. The blade 10 may be formed by rigid, semi-rigid, or non-rigid materials. For example, the blade 10 may be formed of a flexible material. Optionally, the leading edge portion and/or trailing edge portion of the blade 10 may be secured or adjustably secured to a main portion of the blade 10 with a flexible material that permits or allows the cross section of the blade to change the camber shape of the blade as the wind acts upon or pushes against the blade. Optionally, the blade 10 may be formed of a flexible element (such as for example cloth, sheet, or membrane) stretched over a rigid or substantially rigid frame including one, two, or more elongate elements that extend along at least a portion of the longitudinal length of the blade, and include a flexible sheet material that extends from and/or between the elongate elements to form the front surfaces 48 and/or rear surfaces 52 of the blade 10. In this embodiment, portions of the frame of the blade 10 may be movable with respect to each other to move or adjust the shape of one or more surfaces or portions of the blade 10 to thereby vary the camber ratio.

Figure 5:
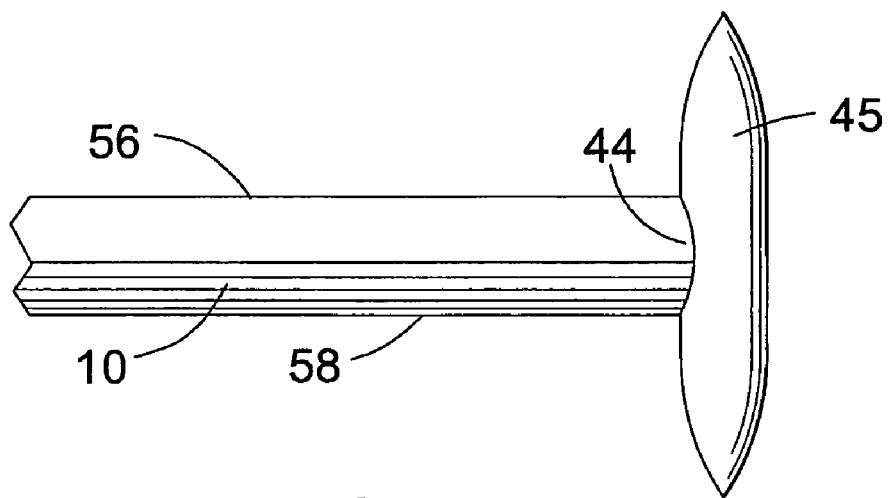
FIG. 5 is a schematic side view of an embodiment of the blade of the present disclosure with an attached winglet.
Figure 8:
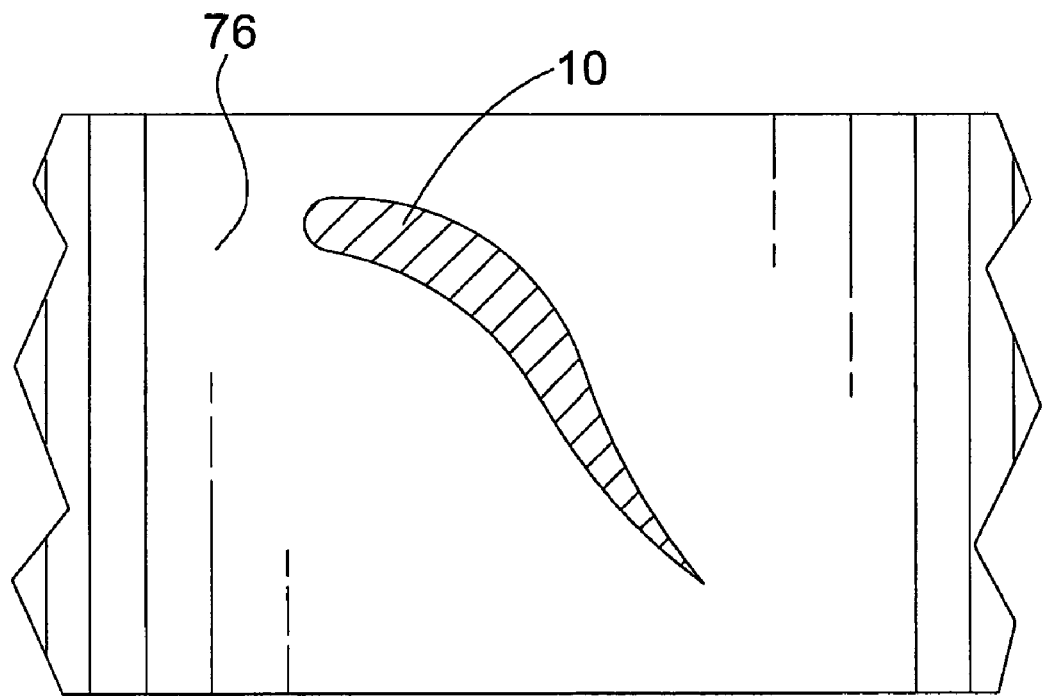
FIG. 8 is a schematic side sectional view of an embodiment of the blade of the present disclosure taken along line 8-8 of FIG. 7.

The pressure on the rear side 50 of the blade 10 is less than the pressure on the front side 46 of the blade 10. The air tends to flow around the tip end 44 of the blade 10 from the front side 46 of the blade 10 to the rear side 50 of the blade 10. In FIG. 5, to prevent the airflow around the tip end 44 of the blade 10, a winglet 45 can be added to the tip end 44 of blade 10. The winglet 45 may extend from tip end 44 to less than, up to, or beyond the leading edge 56 of blade 10.

Figure 6:
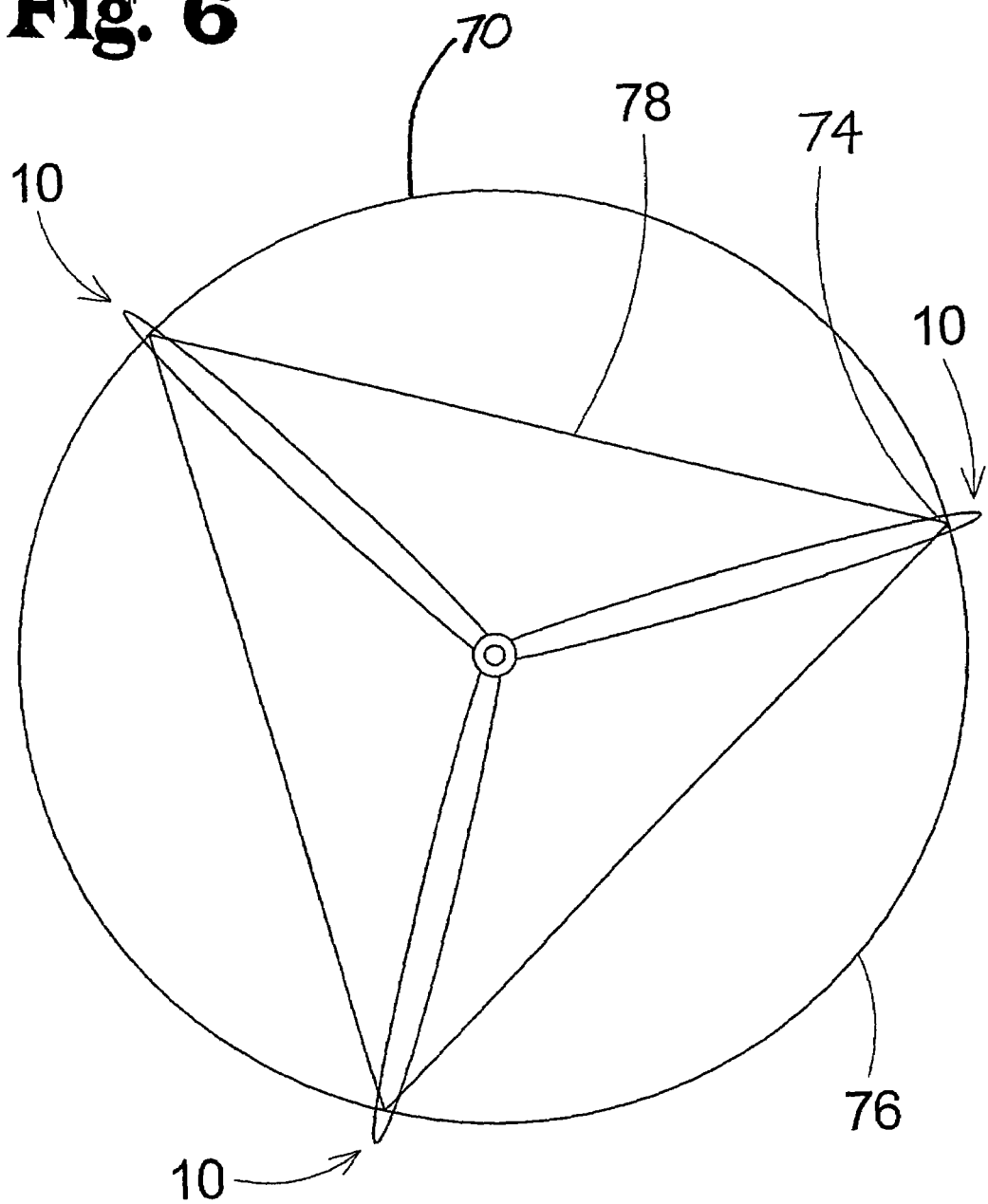
FIG. 6 is a schematic front view of the rotor assembly of the present disclosure showing an optional bracing means.
Figure 7:
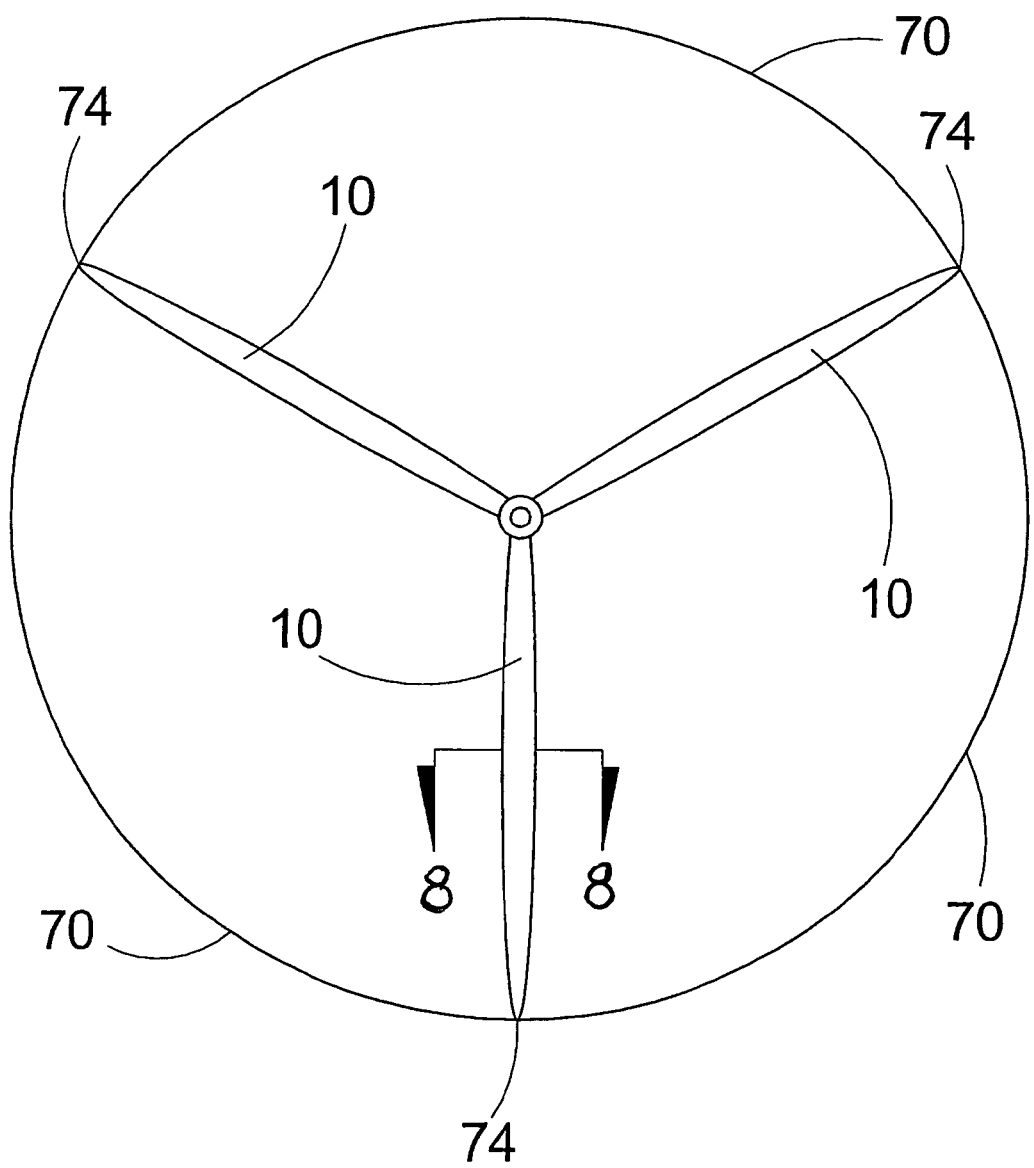
FIG. 7 is a schematic front view of the rotor assembly of the present disclosure showing another optional bracing means.

In FIG. 6 and FIG. 7, one or more of the plurality of blades 30 may be connected by one or more bracing means 70. Attachment points 74 for the bracing means 70 may be located along the longitudinal lengths of the plurality of blades 30. The bracing means 70 couple to the attachment points 74 on the plurality of blades 30. The bracing means 70 may be a curved bracing means 76. The bracing means 70 may be a linear bracing means 78. The bracing means 70 may be flexible, or may be relatively rigid. The bracing means 70 may be of any shape or dimensions. In one embodiment, shown in FIG. 8, the curved bracing means 76 are equal to or greater than the chord length of the blade 10 to which the bracing means 76 is attached. The curved bracing means 76 may help prevent the airflow around the tip end 44 of the blade 10 from escaping over the tip end 44 of blade 10 thus preserving power.

Figure 9:
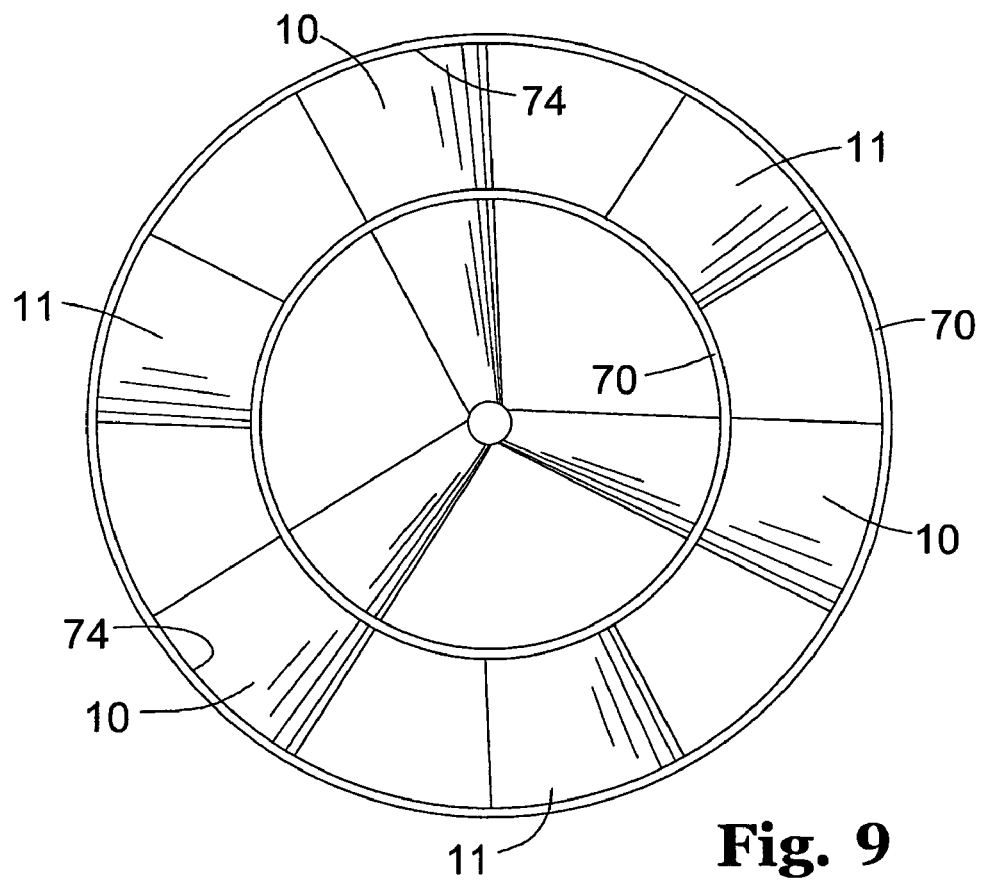
FIG. 9 is a schematic front view of the rotor assembly of the present disclosure showing intermediate blades mounted on the bracing means.

In FIG. 9, one or more of the intermediate blades 11 may be connected by one or more bracing means 70. The attachment points 74 for the bracing means 70 may be located along the longitudinal lengths of the intermediate blade 11.

Figure 10:
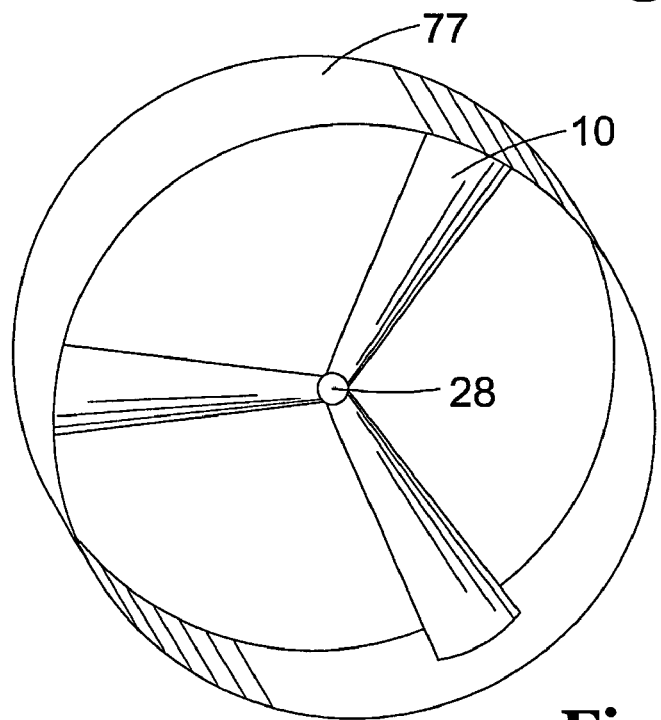
FIG. 10 is a schematic front view of the rotor assembly of the present disclosure showing a bracing means including a shroud.
Figure 11:
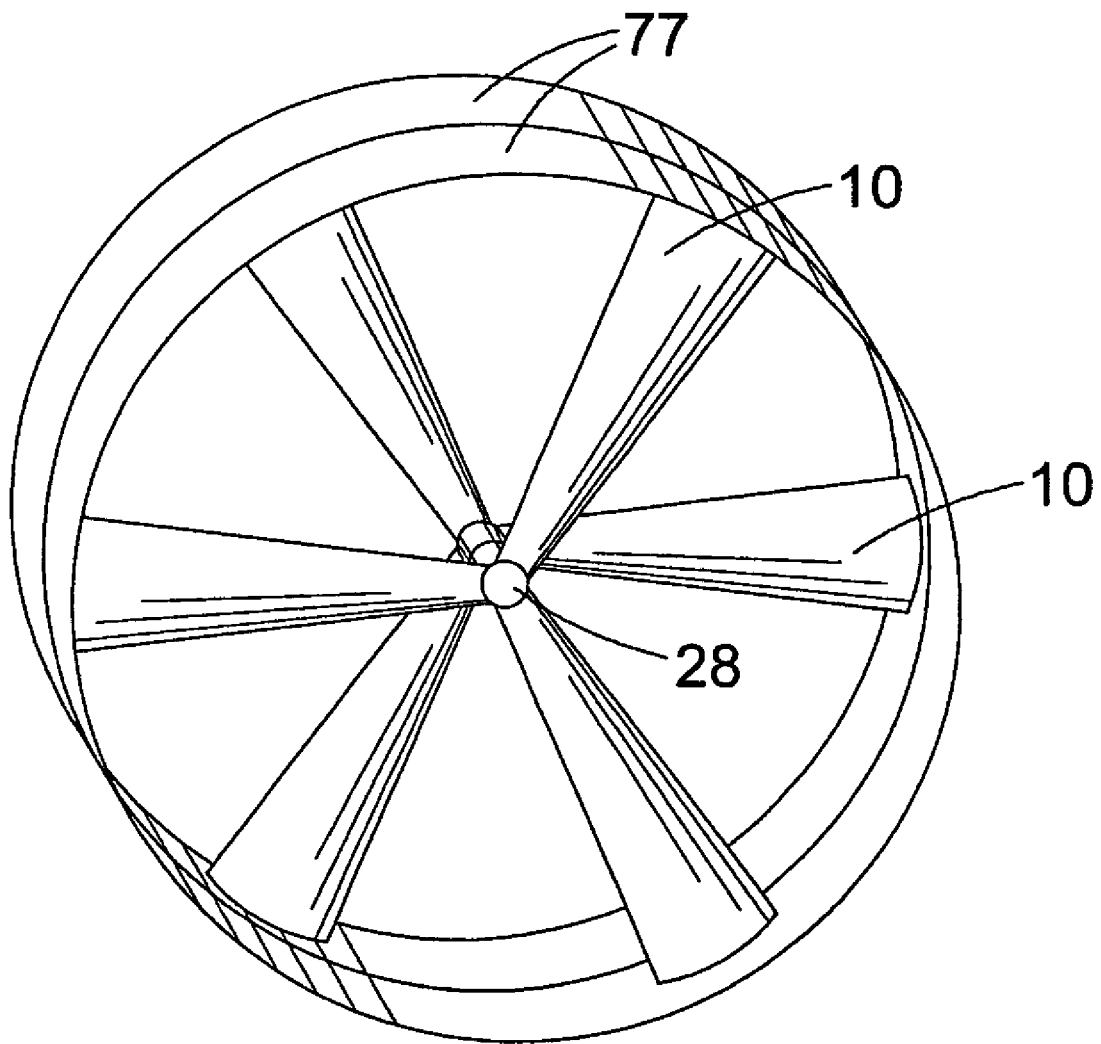
FIG. 11 is a schematic front view of a pair of the rotor assemblies of the present disclosure configured in series with respect to each other.

In some embodiments, such as is shown in FIG. 10, the curved bracing means 76 form a rotating shroud 77. The rotating shroud 77 is also referred to as a rotating cowling or a rotating ducting. The rotating shroud 77 may help prevent the airflow around the tip end 44 of the blade 10 from escaping over the tip end 44 of blade 10. The rotating shroud 77 may keep more of the winds energy in the swept area of blade 10.

Two or more of the rotor assemblies 20 may be positioned in a series arrangement and in a substantially coaxial relationship (see FIG. 11) so that air passing through or by one of the rotor assemblies also passes by another one of the rotor assemblies. The rotor assemblies 20 may be in a counter-rotating relationship so that adjacent rotor assemblies turn in different directions.

With respect to the above description then, it is to be realized that the optimum dimensional relationships for the parts of the invention, to include variations in size, materials, shape, form, number, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A blade for use in a wind turbine, the blade having a longitudinal axis for extending radially outwardly from a center of rotation of the blade on the wind turbine, the blade having a front side with a front surface for orienting in a windward direction and a rear side with a rear surface for orienting in a leeward direction;
   wherein the blade has a profile taken in a plane oriented substantially perpendicular to the longitudinal axis of the blade, the profile of the blade having a leading edge and a trailing edge;
   wherein the profile is characterized by a camber ratio, and the camber ratio of the profile is greater than or equal to approximately 4%;
   wherein the front surface of the front side of the blade is substantially concave in shape; and
   wherein a thickness of the profile is defined between the front surface of the blade and the rear surface of the blade, the thickness of the blade varying in dimension between the leading edge and the trailing edge.

2. The blade of claim 1 wherein the rear surface of the rear side of the blade is substantially convex in shape.

3. The blade of claim 1 wherein the camber ratio of the profile is between approximately 4% and approximately 50%.

4. The blade of claim 1 wherein the camber ratio of the profile is between approximately 5% and approximately 45%.

5. The blade of claim 1 wherein the profile is highly asymmetric.

6. The blade of claim 1 wherein the blade has a plurality of different profiles located at discrete distances from the center of rotation of the rotor assembly.

7. The blade of claim 1 wherein the shape of the leading edge of the profile of the blade is aerodynamic.

8. The blade of claim 1 wherein the leading edge of the profile of the blade is rounded.

9. The blade of claim 1 wherein bracing means are coupled thereto.

10. The blade of claim 9 wherein an intermediate blade is connected by the bracing means.

11. The blade of claim 9 wherein the bracing means is equal to or greater than the chord of the blade.

12. The blade of claim 1 wherein a winglet is attached to the tip end of the blade.

13. The blade of claim 1 wherein bracing means are coupled to the tip end of the blade.

14. The blade of claim 13 wherein curved bracing means is coupled to the tip end of the blade.

15. The blade of claim 14 wherein the curved bracing means coupled to the tip end of the blade is a shroud.

16. The blade of claim 1 wherein the leading edge of the blade curves around the longitudinal axis of the blade.

17. The blade of claim 1 wherein the trailing edge of the blade curves around the longitudinal axis of the blade.

18. The blade of claim 1 wherein the leading edge of the blade and the trailing edge of the blade curve around the longitudinal axis of the blade.

19. The blade of claim 1 wherein the camber ratio profile along the blade remains the same when the leading edge of the blade and the trailing edge of the blade curve around the longitudinal axis of the blade.

20. The blade of claim 1 wherein one or more of the camber ratio profiles along the blade change when the leading edge of the blade and the trailing edge of the blade curve around the longitudinal axis of the blade.

21. The blade of claim 1 wherein one or more of the chord lengths along the blade change.

22. The blade of claim 1 wherein one or more of the chord lengths from the root end of the blade to the tip end of the blade decrease.

23. The blade of claim 1 wherein one or more of the chord lengths from the root end of the blade to the tip end of the blade increase.

24. The blade of claim 1 wherein the blade is concave over substantially an entirety of the front surface of the blade.

25. The blade of claim 1 wherein the camber ratio of the profile is between approximately 10% and approximately 40%.

26. The blade of claim 1 wherein the camber ratio of the profile is substantially uniform from the root end of the blade to the tip end of the blade.

27. The blade of claim 1 wherein the profile of the blade has a chord line extending from the leading edge to the trailing edge, the chord line having a length;
wherein the concavity of the front surface extends above the chord line starting at a point on the chord line, the point being located on the chord line at a distance from the leading edge measured as a percentage of the length of the chord line, the distance being in a range of approximately 0% to approximately 60% of the length of the chord line.

28. The blade of claim 1 wherein a distance measured along the front surface of the blade between the leading edge and the trailing edge of the profile is less than a distance measured along the rear surface of the blade between the leading edge and the trailing edge of the profile.

29. The blade of claim 1 wherein the profile is characterized by the front surface being curved substantially continuously between the leading edge and the trailing edge.

30. The blade of claim 1 wherein the profile is characterized by the front surface of the blade and the rear surface of the blade diverging in a region of the profile located relatively toward the leading edge and the front surface of the blade and the rear surface of the blade converging in a region of the profile located relatively toward the trailing edge.

31. The blade of claim 1 wherein the thickness of the blade is relatively larger toward the leading edge of the profile and relatively smaller toward the trailing edge of the profile.

32. A wind turbine comprising:
a power generation apparatus mounted on an upright tower and being rotatable about a substantially vertical axis to orient the power generation apparatus with respect to the upright tower, the power generation apparatus comprising:
a rotor assembly rotatably mounted on the upright tower for rotation about a primary axis, the rotor assembly having a center of rotation, the primary axis being substantially horizontally oriented, the rotor assembly comprising:
a primary shaft rotatable about the primary axis;
a hub rotatable with the primary shaft; and
a plurality of blades mounted on and radiating outwardly from the hub;
wherein at least one blade of the plurality of blades has a longitudinal axis for extending radially outwardly from a center of rotation of the blade on the wind turbine, the at least one blade having a front side with a front surface for orienting in a windward direction and a rear side with a rear surface for orienting in a leeward direction;
wherein the at least one blade has a profile taken in a plane oriented substantially perpendicular to the longitudinal axis of the blade;
wherein the profile is characterized by a camber ratio, and the camber ratio of the profile is greater than or equal to approximately 4%;
wherein the front surface of the front side of the blade is substantially concave in shape;
wherein a thickness of the profile is defined between the front surface of the blade and the rear surface of the blade, the thickness of the blade varying in dimension between the leading edge and the trailing edge; and
a generator rotatable by the primary shaft.

33. The wind turbine of claim 32 wherein the front surface of the front side of the blade is substantially concave in shape.

34. The wind turbine of claim 32 wherein the rear surface of the rear side of the blade is substantially convex in shape.

35. The wind turbine of claim 32 wherein the camber ratio of the profile is between approximately 4% and approximately 50%.

36. The wind turbine of claim 32 wherein the camber ratio of the profile is between approximately 5% and approximately 45%.

37. The wind turbine of claim 32 wherein the profile is highly asymmetric.

38. The wind turbine of claim 32 wherein the blade has a plurality of different profiles located at discrete distances from the center of rotation of the rotor assembly.

39. The wind turbine of claim 32 wherein the shape of the leading edge of the profile of the blade is aerodynamic.

40. The wind turbine of claim 32 wherein the leading edge of the profile of the blade is rounded.

41. The wind turbine of claim 32 wherein the leading edge of the blade curves around the longitudinal axis of the blade.

42. The wind turbine of claim 32 wherein the trailing edge of the blade curves around the longitudinal axis of the blade.

43. The wind turbine of claim 32 wherein the leading edge of the blade and the trailing edge of the blade curve around the longitudinal axis of the blade.

44. The wind turbine of claim 32 wherein the camber ratio profile along the blade remains the same when the leading edge of the blade and the trailing edge of the blade curve around the longitudinal axis of the blade.

45. The wind turbine of claim 32 wherein one or more of the camber ratio profiles along the blade change when the leading edge of the blade and the trailing edge of the blade curve around the longitudinal axis of the blade.

46. The wind turbine of claim 32 wherein one or more of the chord lengths along the blade change.

47. The wind turbine of claim 32 wherein one or more of the chord lengths from the root end of the blade to the tip end of the blade decrease.

48. The wind turbine of claim 32 wherein one or more of the chord lengths from the root end of the blade to the tip end of the blade increase.

49. The wind turbine of claim 32 wherein bracing means are coupled thereto.

50. The wind turbine of claim 49 wherein an intermediate blade is connected by the bracing means.

51. The wind turbine of claim 49 wherein the bracing means is equal to or greater than the chord of the blade.

52. The wind turbine of claim 32 wherein a winglet is attached to the tip end of the blade.

53. The wind turbine of claim 32 wherein bracing means are coupled to the tip end of the blade.

54. The wind turbine of claim 32 wherein curved bracing means is coupled to the tip end of the blade.

55. The wind turbine of claim 54 wherein the curved bracing means coupled to the tip end of the blade is a shroud.

56. The wind turbine of claim 32 additionally comprising an orientation apparatus configured to rotate the power generation apparatus about a substantially vertical axis and orient the front surface of the front side in the windward direction and the rear surface of the rear side in a leeward direction.

57. The wind turbine of claim 32 additionally comprising a brace extending between at least two of the blades of the plurality of blades.

58. The wind turbine of claim 32 additionally comprising a pair of braces extending between at least two of the blades of the plurality of blades, a first one of the braces extending between tip portions of the at least two blades and a second one of the braces extending between intermediate portions of the at least two blades.

59. The wind turbine of claim 32 additionally comprising:
a pair of braces extending between at least two of the blades of the plurality of blades, a first one of the braces extending between tip portions of the at least two blades and a second one of the braces extending between intermediate portions of the at least two blades; and
an intermediate blade extending between the first brace and the second brace, the intermediate blade being free of connection to the hub other than through the first and second braces.

60. A wind turbine comprising:
an upright tower; and
a power generation apparatus mounted on the upright tower and being rotatable about a substantially vertical axis to orient the power generation apparatus with respect to the upright tower, the power generation apparatus comprising:
a rotor assembly rotatably mounted on the upright tower for rotation about a primary axis, the rotor assembly having a center of rotation, the primary axis being substantially horizontally oriented, the rotor assembly comprising:
a primary shaft rotatable about the primary axis;
a hub rotatable with the primary shaft; and
a plurality of blades mounted on and radiating outwardly from the hub, at least one blade of the plurality of blades being elongated with a longitudinal axis, the longitudinal axis extending radially outwardly from the center of rotation of the rotor assembly, the at least one blade having a root end connected to the hub, the at least one blade having a tip end opposite the root end, the at least one blade having a front side for orienting in a windward direction, the front side having a front surface, the at least one blade having a rear side for orienting in a leeward direction, the rear side having a rear surface;
wherein the at least one blade has a profile taken in a plane oriented substantially perpendicular to the longitudinal axis of the blade, the at least one blade having a plurality of different profiles located at discrete distances from the center of rotation of the rotor assembly;
wherein the profile of the at least one blade has a leading edge and a trailing edge;
wherein the profile includes a chord line extending from the leading edge to the trailing edge, the chord line being angled with respect to the plane of rotation, an angle being defined between the chord line and the plane of rotation;
wherein the profile is highly asymmetric;
wherein the leading edge of the profile of the at least one blade is aerodynamic,
wherein the front side of the at least one blade in the profile is concave in shape;
wherein the rear side of the at least one blade in the profile is convex in shape;
wherein a thickness of the profile is defined between the front surface of the blade and the rear surface of the blade, the thickness of the blade varying in dimension between the leading edge and the trailing edge; and
a generator mounted on the upright tower, the generator being configured to be rotated by the primary shaft, the generator being positioned in a nacelle.

61. The wind turbine of claim 60 wherein the leading edge of the blade curves around the longitudinal axis of the blade.

62. The wind turbine of claim 60 wherein the trailing edge of the blade curves around the longitudinal axis of the blade.

63. The wind turbine of claim 60 wherein the leading edge of the blade and the trailing edge of the blade curve around the longitudinal axis of the blade.

64. The wind turbine of claim 60 wherein the camber ratio profile along the blade remains the same when the leading edge of the blade and the trailing edge of the blade curve around the longitudinal axis of the blade.

65. The wind turbine of claim 60 wherein one or more of the camber ratio profiles along the blade change when the leading edge of the blade and the trailing edge of the blade curve around the longitudinal axis of the blade.

66. The wind turbine of claim 60 wherein one or more of the chord lengths along the blade change.

67. The wind turbine of claim 60 wherein one or more of the chord lengths from the root end of the blade to the tip end of the blade decrease.

68. The wind turbine of claim 60 wherein one or more of the chord lengths from the root end of the blade to the tip end of the blade increase.

69. The wind turbine of claim 60 wherein bracing means are coupled thereto.

70. The wind turbine of claim 69 wherein an intermediate blade is connected by the bracing means.

71. The wind turbine of claim 69 wherein the bracing means is equal to or greater than the chord of the blade.

72. The wind turbine of claim 60 wherein a winglet is attached to the tip end of the blade.

73. The wind turbine of claim 60 wherein bracing means are coupled to the tip end of the blade.

74. The wind turbine of claim 60 wherein curved bracing means is coupled to the tip end of the blade.

75. The wind turbine of claim 74 wherein the curved bracing means coupled to the tip end of the blade is a shroud.

76. A wind turbine comprising:

an upright tower; and a power generation apparatus mounted on the upright tower and being rotatable about a substantially vertical axis to orient the power generation apparatus with respect to the upright tower, the power generation apparatus comprising:

a rotor assembly rotatably mounted on the upright tower for rotation about a primary axis, the rotor assembly having a center of rotation, the primary axis being substantially horizontally oriented, the rotor assembly comprising:

a primary shaft rotatable about the primary axis;

a hub rotatable with the primary shaft; and a plurality of blades mounted on and radiating outwardly from the hub, at least one blade of the plurality of blades being elongated with a longitudinal axis, the longitudinal axis extending radially outwardly from the center of rotation of the rotor assembly, the at least one blade having a root end connected to the hub, the at least one blade having a tip end opposite the root end, the at least one blade having a front side for orienting in a windward direction, the front side having a front surface, the at least one blade having a rear side for orienting in a leeward direction, the rear side having a rear surface;

wherein the at least one blade has a profile taken in a plane oriented substantially perpendicular to the longitudinal axis of the blade, the at least one blade having a plurality of different profiles located at discrete distances from the center of rotation of the rotor assembly;

wherein the profile of the at least one blade has a leading edge and a trailing edge;

wherein the profile includes a chord line extending from the leading edge to the trailing edge, the chord line being angled with respect to the plane of rotation, an angle being defined between the chord line and the plane of rotation;

wherein the profile is highly asymmetric;

wherein the leading edge of the profile of the at least one blade is rounded;

wherein the front side of the at least one blade in the profile is concave in shape;

wherein the rear side of the at least one blade in the profile is convex in shape;

wherein a thickness of the profile is defined between the front surface of the blade and the rear surface of the blade, the thickness of the blade varying in dimension between the leading edge and the trailing edge; and a generator mounted on the upright tower, the generator being configured to be rotated by the primary shaft, the generator being positioned in a nacelle.

77. The wind turbine of claim 76 wherein bracing means are coupled thereto.

78. The wind turbine of claim 76 wherein the bracing means is equal to or greater than the chord of the blade.

79. The wind turbine of claim 76 wherein the winglet is attached to the tip end of the blade.

80. The wind turbine of claim 76 wherein bracing means are coupled to the tip end of the blade.

81. The wind turbine of claim 76 wherein curved bracing means is coupled to the tip end of the blade.

82. The wind turbine of claim 81 wherein the curved bracing means coupled to the tip end of the blade is a shroud.

83. A blade for use in a wind turbine, the blade having a longitudinal axis for extending radially outwardly from a center of rotation of the blade on the wind turbine, the blade having a front side with a front surface for orienting in a windward direction and a rear side with a rear surface for orienting in a leeward direction;

wherein the blade has a profile taken in a plane oriented substantially perpendicular to the longitudinal axis of the blade, the profile of the blade having a leading edge and a trailing edge;

wherein the profile is characterized by a camber ratio, and the camber ratio of the profile is greater than or equal to approximately 4%;

wherein the front surface of the front side for orienting in the windward direction is substantially concave in shape;

wherein the rear surface of the rear side for orienting in a leeward direction is substantially convex in shape; and wherein a thickness of the profile is defined between the front surface of the blade and the rear surface of the blade, the thickness of the blade varying in dimension between the leading edge and the trailing edge.

* * * * *